(12) United States Patent
Russo et al.

(10) Patent No.: US 11,503,101 B1
(45) Date of Patent: Nov. 15, 2022

(54) DEVICE AND METHOD FOR ASSIGNING VIDEO ANALYTICS TASKS TO COMPUTING DEVICES

(71) Applicant: MOTOROLA SOLUTIONS, INC., Chicago, IL (US)

(72) Inventors: Pietro Russo, Melrose, MA (US); Howard Hoffman, Belmont, MA (US); Sven Rebien, Victoria (CA); Bert Van Der Zaag, Wheat Ridge, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/644,512

(22) Filed: Dec. 15, 2021

(51) Int. Cl.
  *G06F 13/00* (2006.01)
  *H04L 65/80* (2022.01)
  *H04N 7/18* (2006.01)

(52) U.S. Cl.
  CPC ............. *H04L 65/80* (2013.01); *H04N 7/183* (2013.01)

(58) Field of Classification Search
  CPC . H04L 65/80; H04L 41/0826; H04L 41/0823; H04N 7/183
  USPC ................ 709/226, 229, 223, 224, 201, 203
  See application file for complete search history.

(56) References Cited

U.S. PATENT DOCUMENTS

| | | | | |
|---|---|---|---|---|
| 9,712,854 | B2 * | 7/2017 | Steiner | H04N 21/23439 |
| 2014/0067898 | A1 * | 3/2014 | Steiner | H04N 21/231 |
| | | | | 709/201 |
| 2020/0034205 | A1 | 1/2020 | Kelly et al. | |
| 2020/0167196 | A1 * | 5/2020 | Smith | H04L 41/5054 |
| 2020/0351380 | A1 * | 11/2020 | Fedorov | H04W 4/70 |
| 2020/0387539 | A1 * | 12/2020 | Ananthanarayanan | G06F 16/738 |
| 2021/0014113 | A1 * | 1/2021 | Guim Bernat | H04L 41/0806 |
| 2021/0081271 | A1 * | 3/2021 | Doshi | G06F 9/45558 |
| 2021/0144517 | A1 * | 5/2021 | Guim Bernat | H04L 47/781 |

FOREIGN PATENT DOCUMENTS

AU 2016216674 B2 9/2016

OTHER PUBLICATIONS

Faraone, Antonio, et al.: "Cloud Device and User Equipment Device Collaborative Decision-Making", U.S. Appl. No. 17/171,621, filed Feb. 9, 2021, all pages.

* cited by examiner

*Primary Examiner* — Kenneth R Coulter
(74) *Attorney, Agent, or Firm* — Raguraman Kumaresan

(57) ABSTRACT

A process of assigning video analytics tasks to computing devices. In operation, an electronic computing device obtains predicted scene data associated with a scene corresponding to which video data is to be captured at a particular time period using a video camera. The electronic computing device then estimates, based on the predicted scene data, an edge computing cost to be incurred to complete execution of a video analytics task at one or more edge computing devices and a cloud computing cost to be incurred to complete execution of the same video analytics task at one or more cloud computing devices. If the edge computing cost is lower than the cloud computing cost, then the electronic computing device assigns the video analytics task to the edge computing devices. Otherwise, then the electronic computing device assigns the video analytics task to the cloud computing devices.

20 Claims, 5 Drawing Sheets

DEVICE AND METHOD FOR ASSIGNING VIDEO ANALYTICS TASKS TO COMPUTING DEVICES

BACKGROUND

Security operators screen video data captured by video cameras (e.g., surveillance cameras) to remotely monitor areas for abnormal or suspicious activities. Since manually screening large amounts of video data received from cameras is a tedious process for operators, security agencies have come to rely on video analytics solutions that automatically analyze the video data and provide alerts to security operators when suspicious objects or activities are detected. Video analytics solutions have use in both security and non-security applications. Non-security applications range from retail to manufacturing to healthcare. As an example, in retail, video analytics solutions can be used to detect when a given item goes out of stock on a shelf and to provide alerts to restock the shelf. In manufacturing, video analytics solutions can be used to instantly identity the defects in the manufactured products. In healthcare, video analytics solutions can be used to detect patient poses and potential fall behavior.

Some organizations may opt for cloud-based video analytics solutions as cloud infrastructure offers tremendous processing power as well as storage capabilities. Other organizations may prefer on-premise or edge-based video analytics solutions due to security risks and data latency issues associated with the cloud infrastructure. Since there are advantages as well as disadvantages associated with both video analytics solutions, some organizations may want to adopt a hybrid approach that allows video analytics to be performed using a combination of edge-based and cloud-based video analytics solutions.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
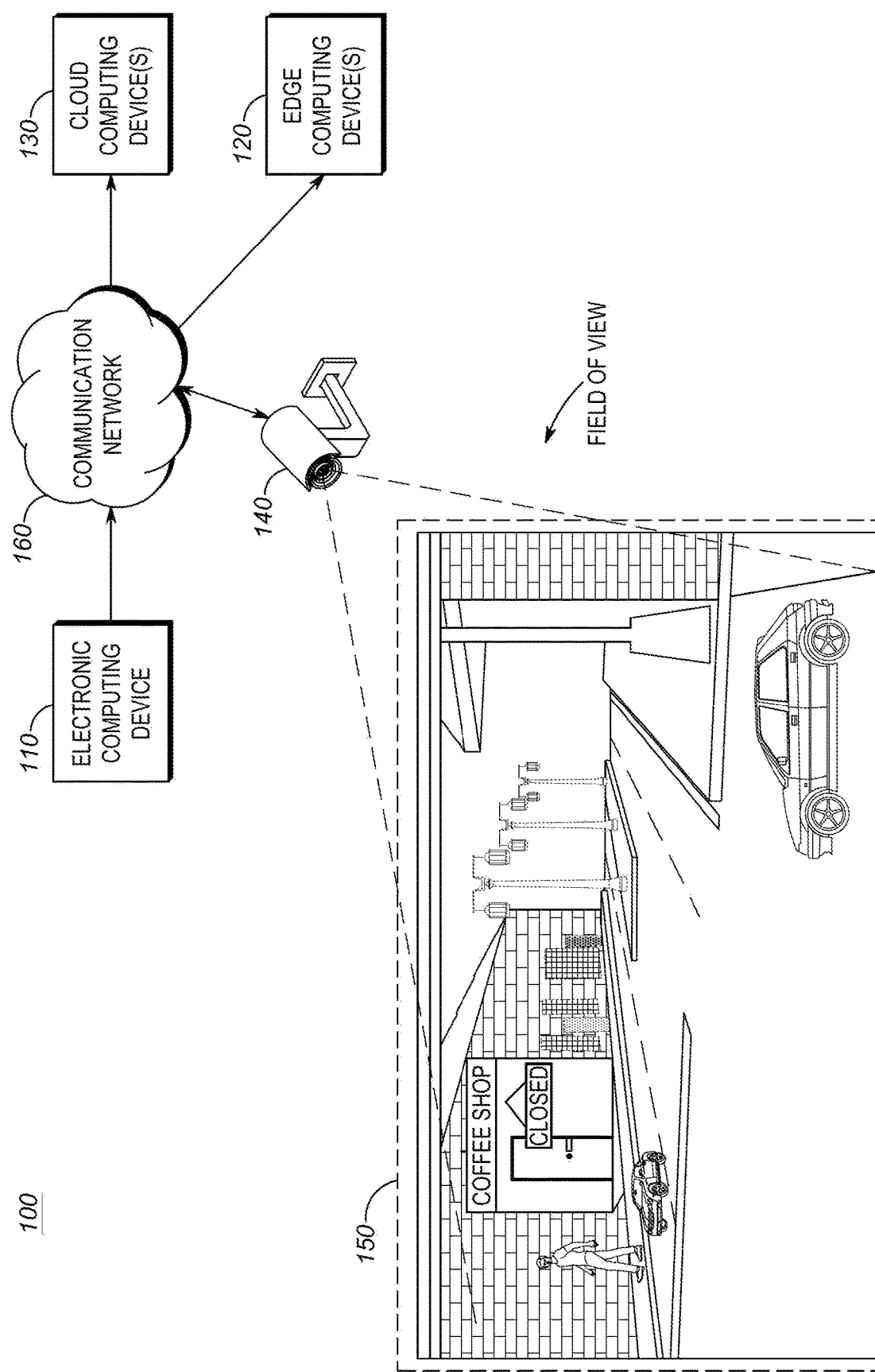
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Performing all video analytics tasks at the edge computing devices would drain the computing resources of the edge computing devices, which in turn may lead to incurring costs associated with repairing, replacing, or upgrading the resources of the edge computing devices. Similarly, running all video analytics tasks using the cloud computing devices has an associated cost, which may vary depending on the subscription service and/or on-demand service offered by cloud-based video analytics providers. Computing resources (e.g., processing load, data storage, network connectivity, electrical power etc.) may dramatically vary depending on the activity levels and environmental factors associated with a scene in addition to the type of analytics to be performed on video streams captured corresponding to the scene. As an example, performing video analytics on a traffic intersection scene during a peak hour may require processing a lot of scene details because of the number of vehicles that may pass through the traffic intersection scene during the peak hour. However, the activity level on a traffic intersection scene may also change depending on a multitude of environmental and contextual factors including time of day, season, geographic location, weather, scheduled events, occurrence of public-safety incidents etc. Since resource requirements and the corresponding cost to run a particular video analytics task may vary depending on the activity levels and environmental factors associated with a scene to be processed, any assignment of video analytics tasks to edge computing devices or cloud computing devices will require consideration of the activity levels at a scene to allow the organizations to optimize its revenue stream without impacting the edge computing resources to unsatisfactory levels. In some instances, the computing resources at the edge may be insufficient to process all video streams captured corresponding to the scene. Accordingly, some organizations may prefer a hybrid video analytics solution for running video analytics on video streams captured by cameras owned and/or operated by the organizations or video analytics service providers. In systems supporting hybrid video analytics solutions, an operator may need to determine when to assign the video streams to edge computing devices and when to assign the video streams to cloud computing devices for purposes of performing video analytics on the video streams captured by the cameras. While an operator could manually process the activity levels currently present at a particular scene and assign the analytics tasks to edge or cloud computing devices based on the activity levels, it would not be scalable for hundreds and thousands of cameras that may be owned and/or operated by organizations or video analytics service providers.

Disclosed is an improved device and process for assigning video analytics tasks to computing devices. In operation, video analytics tasks are automatically identified and assigned to edge computing devices or cloud computing devices based on estimation of costs that will be respectively incurred for processing the same video analytics task at the edge computing devices and the cloud computing device. In particular, the costs are estimated by predicting in advance scene data (e.g., number of persons predicted to be present at a scene at a particular time period in the future) that will be associated with a scene. In other words, video analytics tasks can be assigned to edge or cloud computing devices based on the predicted scene data. This eliminates the need for a human operator to manually process the present scene data and further manually assign the video analytics task to either the edge computing devices or the cloud computing devices.

One embodiment provides a method of assigning video analytics tasks to computing devices. The method comprises: obtaining, at an electronic computing device, predicted scene data associated with a scene corresponding to which video data is to be captured at a particular time period using one or more video cameras; determining, at the electronic computing device, a video analytics task to be performed on the video data; estimating; at the electronic computing device, based on the predicted scene data, a edge computing cost to be incurred to complete execution of the video analytics task at one or more edge computing devices; estimating, at the electronic computing device, based on the predicted scene data, a cloud computing cost to be incurred to complete execution of the video analytics task at one or more cloud computing devices; assigning, at the electronic computing device, the video analytics task to the one or more edge computing devices when the edge computing cost is lower than the cloud computing cost; and assigning, at the electronic computing device, the video analytics task to the one or cloud computing devices when the edge computing cost is not lower than the cloud computing cost.

Another embodiment provides an electronic computing device comprising a communications interface and an electronic processor communicatively coupled to the communication interface. The electronic processor is configured to: obtain predicted scene data associated with a scene corresponding to which video data is to be captured at a particular time period using one or more video cameras; determine a video analytics task to be performed on the video data; estimate, based on the predicted scene data, a edge computing cost to be incurred to complete execution of the video analytics task at one or more edge computing devices; estimate, based on the predicted scene data, a cloud computing cost to be incurred to complete execution of the video analytics task at one or more cloud computing devices; assign the video analytics task to the one or more edge computing devices when the edge computing cost is lower than the cloud computing cost; and assign the video analytics task to the one or cloud computing devices when the edge computing cost is not lower than the cloud computing cost.

Each of the above-mentioned embodiments will be discussed in more detail below, starting with example system and device architectures of the system in which the embodiments may be practiced, followed by an illustration of processing blocks for achieving an improved technical device and method for assigning video analytics tasks to computing devices. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an electronic computing device 110 configured to assign video analytics tasks to computing devices selected from one or more of edge computing devices 120 and cloud computing devices 130. The electronic computing device 110 may be implemented as a standalone electronic device or alternatively integrated into one or more of the edge computing devices 120 and the cloud computing devices 130. The system 100 further includes a video camera 140 that is configured to capture a video stream of a real-world scene 150 corresponding to a field of view of the video camera 140. In accordance with embodiments, the entire video stream or portions of the video stream captured by the video camera 140 is processed at one or more of the edge computing devices 120 or the cloud computing devices 130. In accordance with some embodiments, the video streams captured by the video camera 140 are temporarily stored at the edge computing devices 120 or the cloud computing devices 130 for performing the video analytics tasks corresponding to the video streams. In these embodiments, the video streams may be deleted from the computing devices 120, 130 after completing execution of the video analytics tasks corresponding to the video streams. Although only one video camera 140 is shown in FIG. 1 for illustrative purposes, any number of fixed or portable video cameras 140 may be deployed in the system 100 in any number of locations. The video cameras 140 may include, but not limited to, a surveillance camera, vehicular camera, body worn camera, mobile phone, drone camera, pocket camera, and the like. In accordance with embodiments, the video camera 140 may be owned or operated by one or more agencies. An agency is an organizational entity that processes video streams captured by the video camera 140 via one or more of the edge computing devices 120 and cloud computing devices 130 related to the organization's goals, activities, and the like. In some embodiments, an agency may represent a private enterprise organization such as press, media, utilities, oil/gas, electric, private security, or other business. In other embodiments, an agency may represent a public organization such as a public-safety agency (e.g., police, fire, emergency medical service), governmental entity (e.g., court, city administration), and the like.

The edge computing devices 120 may contain any number of devices or servers that may be arranged or implemented within one or more of the video cameras 140 to which the edge computing devices 120 are associated. The edge computing devices 120 may alternatively be arranged at a location physically closer to one or more of the associated video cameras 140. For instance, one or more edge computing device 120 may be housed in the same premise (e.g., same building or facility), or otherwise coupled to the same communication network (e.g., a local area network), as the video camera 140, such that video streams captured by the video camera 140 can be transmitted to edge computing device 120 while reducing network delay associated with transmitting such video streams for processing and/or storing at a remote server such as the cloud computing device 130. Each edge computing device 120 includes a local video analytics engine that is configured to analyze video data captured by an associated video camera 140 corresponding to a scene 150 and further detect an activity of interest (e.g., a person, object, or event) from the captured video stream according to a type of video analytics task assigned to the edge computing device 120. In one embodiment, the video analytics engine is programmed with a detection classifier that evaluates the video data, for example, an image or part of an image of the video data captured by the video camera 140 to determine if an instance of a person, object, or event of interest that is defined in the detection classifier is detected or not from the evaluated video stream. The edge computing device 120 may then locally store and/or transmit results (e.g., detection of a person, object, or event of interest) of the video analytics task to a remote server for consumption by the agency operating the video camera 140. In accordance with some embodiments, the edge computing devices 120 are owned and/or operated by an agency that also owns and/or operates the video cameras 140 associated with the edge computing devices 120.

The cloud computing devices 130 may comprise any number of computing devices and servers, and may include any type and number of resources, including resources that facilitate communications with and between servers, storage by the servers that are hosted remotely over a communication network 160. The cloud computing devices 130 may include any resources, services, and/or functionality that can be utilized through an on-demand or subscription service for executing video analytics tasks. For example, an agency operating the video camera 140 may assign certain video analytics tasks corresponding to video data captured by the video camera 140 to one or more cloud computing devices 130. The cloud computing devices 130 may similarly implement a video analytics engine that is configured to process video data captured by the video camera 140 to detect a person, object, or event of interest according to a type of video analytics task assigned to the cloud computing device 130. The cloud computing device 130 may then store and/or transmit results (e.g., detection of a person, object, or event of interest) of the video analytics task to a remote server for consumption by the agency operating the video camera 140.

The electronic computing device 110, the edge computing devices 120, the cloud computing devices 130, and the video cameras 140 may each include one or more wired or wireless communication interfaces for communicating with other devices operating in the system 100 via the communication network 160. The communication network 160 is an electronic communications network including wired and wireless connections. The communication network 160 may be implemented using a combination of one or more networks including, but not limited to, a wide area network, for example, the internet; a local area network, for example, a Wi-Fi network, or a near-field network, for example, a Bluetooth™ network. Other types of networks, for example, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof may also be used. As an example, the video camera 140 may transmit video data captured by the video camera 140 to edge computing devices 120 via a local area network to enable the edge computing device 120 to execute an assigned video analytics task. As another example, the video camera 140 may transmit video data captured by the video camera 140 to cloud computing devices 130 via a wide area network to enable the cloud computing devices 130 to execute an assigned video analytics task.

In accordance with embodiments, the electronic computing device 110 is configured to assign video analytics tasks to computing devices selected from one or more of the edge computing devices 120 and cloud computing devices 130. Although only one electronic computing device 110 is shown in FIG. 1 for illustrative purposes, any number of electronic computing devices 110 may be deployed in the system 100, where each electronic computing device 110 may provide video analytics assignment services to a different agency. A given electronic computing device 110 may assign video analytics tasks corresponding to an assigned number of video cameras 140, for example, all or a subset of video cameras 140 owned and/or operated by a particular agency. The electronic computing device 110 may be operated by an agency that also owns and/or operates the video camera 140 corresponding to which the electronic computing device 110 assigns video analytics tasks to computing devices 120, 130. Alternatively, the electronic computing device 110 may be operated by one agency (e.g., video analytics service provider) to provide video analytics assignment services to other agencies (i.e., agencies owning and/or operating their own video cameras 140) subscribing to such services. In accordance with some embodiments, the electronic computing device 110 may receive an input indicating a particular time period in the future (e.g., during a peak-hour on a weekday or an off-peak hour on a weekend) during which video analytics is to be run corresponding to video data to be captured by a particular one or more video cameras 140. In operation, the electronic computing device 110 obtains predicted scene data associated with a scene 150 (e.g., a scene that will be within a field-of-view of one or more video cameras 140) corresponding to which video data is to be captured at a particular time period in the future using one or more video cameras 140. The electronic computing device 110 then determines a video analytics task to be performed. The video analytics task may include, for example, detecting a person (e.g., a wanted suspect), an object (e.g., a vehicle displaying a particular license plate number), an event of interest (e.g., abnormal crowd behavior), or a combination of multiple tasks (e.g., searching for a wanted suspect in addition to running license plates of vehicles detected in a scene 150). The electronic computing device 110 estimates, based on the predicted scene data, an edge computing cost to be incurred to complete execution of the video analytics task at one or more edge computing devices 120.

The electronic computing device 110 also estimates, based on the predicted scene data, a cloud computing cost to be incurred to complete execution of the video analytics task at one or more cloud computing devices 130. If the edge computing cost is lower than the cloud computing cost, the electronic computing device 110 assigns the video analytics task to the one or more edge computing devices 120. On the other hand, if the edge computing cost is not lower than the cloud computing cost, the electronic computing device 110 assigns the video analytics task to the one or cloud computing devices 130.

Figure 2:
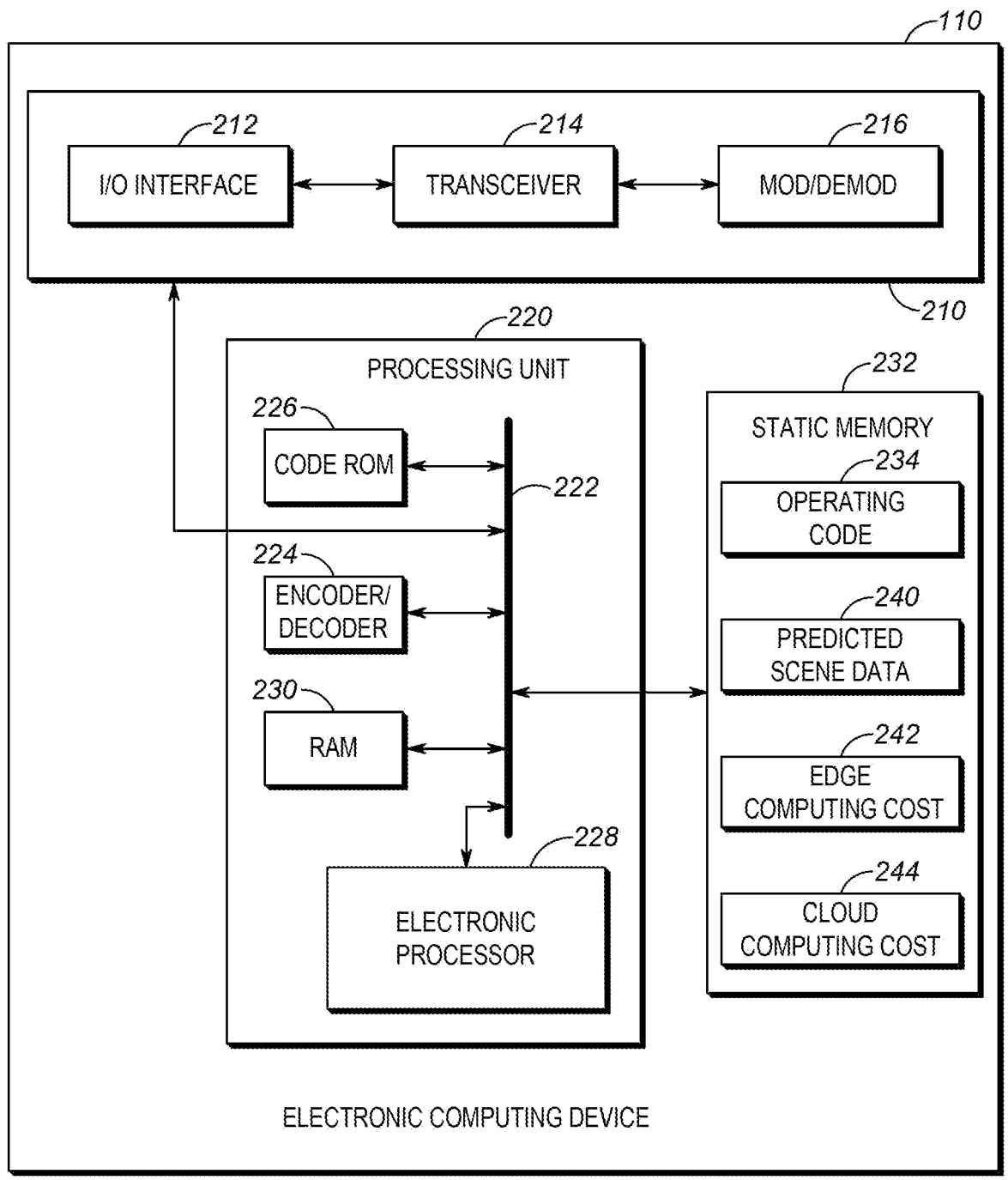
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 performs the functions of the electronic computing device 110 shown in FIG. 1 and may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the electronic computing device 110 may be executed at one or more of the edge computing devices 120, cloud computing devices 130, and video cameras 140. While FIG. 2 represents an electronic computing device 110 described above with respect to FIG. 1, depending on the type of electronic computing device 110, the electronic computing device 110 may include fewer or additional components in configurations different from that illustrated in FIG. 2.

As shown in FIG. 2, the electronic computing device 110 includes a communications interface 210 coupled to a common data and address bus 222 of a processing unit 220. The communications interface 210 sends and receives data to and from other devices (e.g., edge computing devices 120, cloud computing devices 130, video cameras 140 etc.) in the system 100. The communications interface 210 may include one or more wired and/or wireless input/output (I/O) interfaces 212 that are configurable to communicate with other devices in the system 100. For example, the communications interface 210 may include one or more wireless transceivers 214, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications interface 210 may additionally or alternatively include one or more wireline transceivers 214, such as an Ethernet transceiver, a USB transceiver, or similar transceiver configurable to communicate via a twisted pair wire, a coaxial cable, a fiber-optic link, or a similar physical connection to a wireline network. The transceiver 214 is also coupled to a combined modulator/demodulator 216.

The processing unit 220 may include an encoder/decoder 224 with a code Read Only Memory (ROM) 226 coupled to the common data and address bus 222 for storing data for initializing system components. The processing unit 220 may further include an electronic processor 228 (for example, a microprocessor, a logic circuit, an application-specific integrated circuit, a field-programmable gate array, or another electronic device) coupled, by the common data and address bus 222, to a Random Access Memory (RAM) 230 and a static memory 232. The electronic processor 228 may generate electrical signals and may communicate signals through the communications interface 210, such as for receipt by the video camera 140, edge computing devices 120, and cloud computing devices 130. The electronic processor 228 has ports for coupling to the other components (e.g., electronic display, user input interface device, microphone, camera, speaker, and the like) within the electronic computing device 110.

Figure 3:
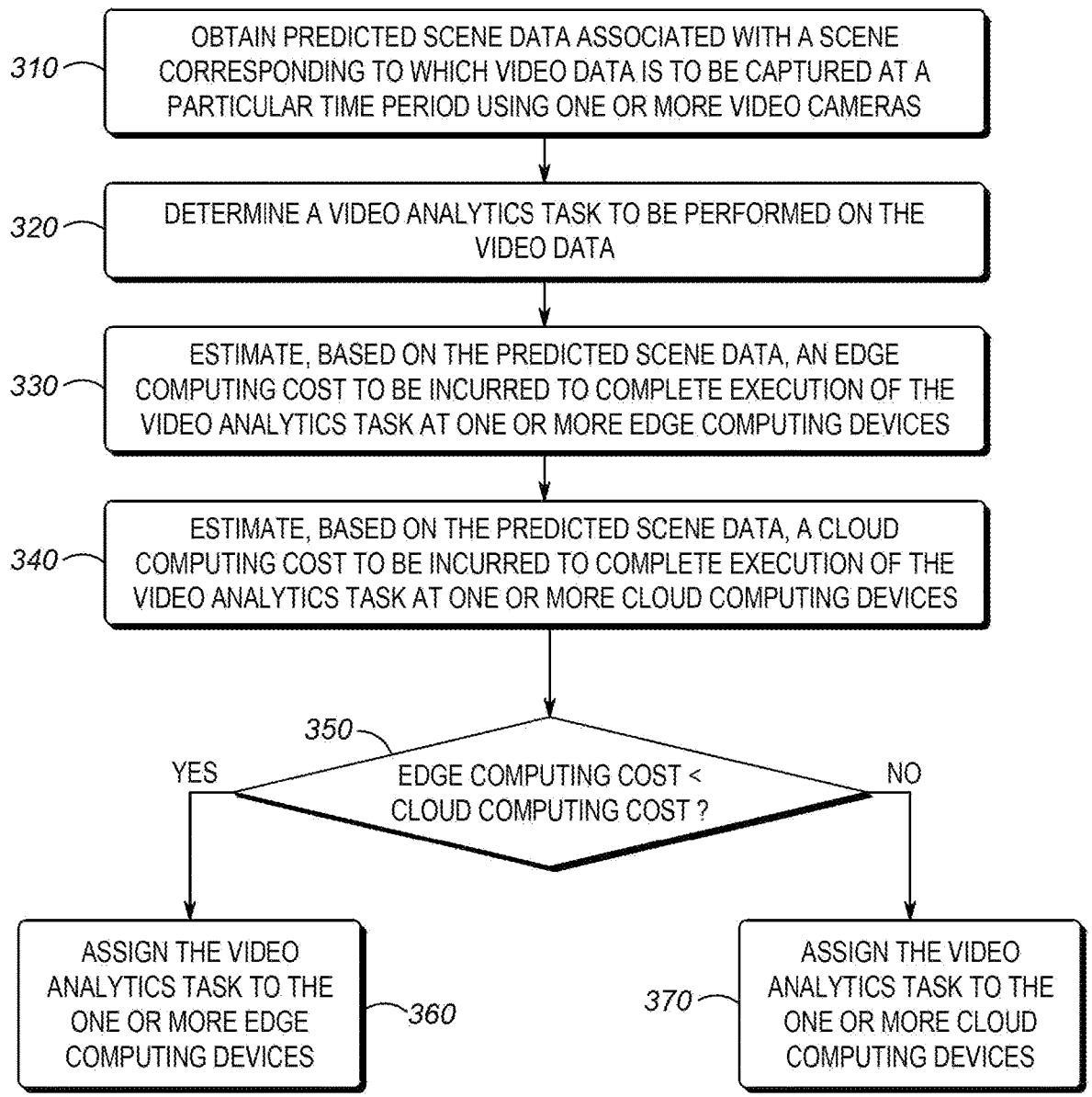
FIG. 3 illustrates a flowchart of a process for assigning video analytics tasks to computing devices.

Static memory 232 may store operating code 234 for the electronic processor 228 that, when executed, performs one or more of the blocks set forth in FIG. 3 and the accompanying text(s). The static memory 232 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 232 may further store information that may be used by the electronic computing device 110 232 to assign video analytics tasks to computing devices selected from one or more of the edge computing devices 120 and the cloud computing devices 130. For example, the static memory 232 stores predicted scene data 240 associated with a scene 150 corresponding to which video data is to be captured at a particular time period using one or more video cameras 140. The predicted scene data 240 may be stored in any suitable data format. In one embodiment, the predicted scene data 240 may be stored as an image indicating activity levels (e.g., an image superimposed with persons and objects) predicted at a scene 150. The static memory 232 may further store an estimated edge computing cost 242 representing a cost to be incurred to complete execution of a particular video analytics task at one or more edge computing devices 120. The static memory 232 may further store an estimated cloud computing cost 244 representing a cost to be incurred to complete execution of the particular video analytics task at the one or more cloud computing devices 130. The estimated edge computing cost 242 and cloud computing cost 244 may be periodically or dynamically updated by the electronic computing device 110 based on one or more of changes in predicted scene data, changes in devices capabilities expected at edge computing devices 120, changes in cloud subscription cost or on-demand cost, and changes in devices capabilities required to complete execution of the video analytics task. In accordance with some embodiments, the electronic computing device 110 assigns a particular video analytics task to the one or more edge computing devices 120 when the edge computing cost 242 is lower than the cloud computing cost 244. Alternatively, the electronic computing device 110 assigns a particular video analytics task to the one or more cloud computing devices 130 when the edge computing cost 242 is not lower than the cloud computing cost 244.

Turning now to FIG. 3, a flowchart diagram illustrates a process 300 of assigning video analytics tasks to computing devices. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 228 implemented at the electronic computing device 110.

The electronic computing device 110 may execute the process 300 at power-on, at some predetermined periodic time period thereafter, in response to a trigger raised locally at the electronic computing device 110 via an internal process or via an input interface (e.g., input interface 212) or in response to a trigger from an external device to which the electronic computing device 110 is communicably coupled, among other possibilities. As an example, the electronic computing device 110 is programmed to trigger execution of the process 300 in response to receiving an input from an authorized user associated with an agency owning and/or operating the video camera 140. The input may include one or more of an identifier identifying a particular video camera (e.g., video camera 140), a type of video analytics task (e.g., searching a person matching characteristics of a wanted suspect) to be performed on video data to be captured by the video camera 140, and a particular time period in the future (e.g., 5:00 PM-6:00 PM next day) during which video data is to be captured at the video camera 140. As another example, the electronic computing device 110 may be programmed to trigger execution of the process 300 periodically or at scheduled time periods.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well. The process 300 will be described below with reference to example predicted scene data shown in FIGS. 4 and 5.

At block 310, the electronic computing device 110 obtains predicted scene data (e.g., predicted scene data 240) associated with a scene (e.g., scene 150) corresponding to which video data is to be captured at a particular time period in the future using one or more video cameras 140 owned and/or operated by an agency. In accordance with some embodiments, the predicted scene data represents a predicted state (e.g., presence of persons or objects or their activity levels, weather, lighting conditions, scheduled events, and predicted incidents etc.) of a scene at a particular time period in the future during which video data is to be captured from the one or more video cameras 140. For example, the predicted scene data for video data to be captured from a scene during a particular time period includes one or more of: (i) data about persons or objects (including a predicted count of persons/objects, predicted activities and behavior level of persons) predicted to be present at the scene at the particular time period, (ii) data about one or more events scheduled or predicted to occur at the scene at the particular time period, (iii) forecasted weather data for a geographical location associated with the scene at the particular time period, and (iv) predicted lighting conditions at the scene at the particular time period. In accordance with some embodiments, the predicted scene data corresponds to video analytics data extracted from one or more prior video data historically captured corresponding to the same scene. The electronic computing device 110 may obtain video analytics data of the prior video data from one or more of the edge computing devices 120, the cloud computing devices 130, or other devices. The electronic computing device 110 may process video analytics data extracted from video data historically captured (e.g., video data captured at noon during the week days for the past one month) at the same scene to obtain information regarding the presence of persons/objects (e.g., count of persons/objects, activities and behavior level, etc.) found at the scene, information regarding any incident that has occurred at the same scene, information regarding historical weather and lighting conditions at the scene, and other contextual information (e.g., a residential zone, a business zone, a traffic intersection, a park, an alley, etc.) about the scene. The predicted scene data may also include information about events (e.g., a scheduled music event, a scheduled sporting event, a scheduled election campaign, an arrival of a delivery truck etc.) scheduled to take place within a predefined geographical distance from a location of the scene. The predicted scene data 240 may also include information regarding incidents predicted to occur at the scene. The electronic computing device 110 may predict the occurrence of an incident based on historical crime data associated with a geographical area containing the scene. The electronic computing device 110 may also predict the occurrence of an incident based on tip information obtained from citizens.

The predicted scene data for the same scene may vary for different time periods in the future. Briefly referring to FIG. 4, an example of an image representing predicted scene data associated with a traffic intersection scene 150-1 is shown. In the example shown in FIG. 4, the predicted scene data represents the state of a traffic intersection scene during an off-peak hour (e.g., morning 6.00 AM on a weekend). In addition, the traffic intersection scene 150-1 includes a coffee shop that is expected to be closed during the off-peak hour. Accordingly, the predicted scene data is expected to indicate low activity with only few persons or vehicles expected to be present at the traffic intersection scene 150-1. Also, briefly referring to FIG. 5, an example of an image representing predicted scene data associated with a traffic intersection scene 150-2 is shown. In the example shown in FIG. 5, the predicted scene data represents the state of a traffic intersection scene during a peak hour (e.g., 4.30 PM on a weekday). In addition, the traffic intersection scene 150-2 includes a coffee shop that is expected to be open with customers frequenting the shop during the peak-hour. Accordingly, the predicted scene data is expected to indicate high activity with a large number of persons and vehicles expected to be present at the traffic intersection scene 150-2.

Returning to FIG. 3, at block 320, the electronic computing device 110 determines a video analytics task to be performed on the video data to be captured by the one or more video cameras 140. The video analytics task may include one or more of detecting a person, object, or event of interest from video data captured by the one or more video cameras. In accordance with embodiments, the electronic computing device 110 may determine one or more video analytics tasks based on a request received from an agency requesting video analytics to be performed on video data to be captured by the video cameras 140. For example, an agency may request to run license plates of all vehicles detected in the video data captured by the video cameras 140. In this example, the electronic computing device 110 may determine a video analytics task that will include running the license plates of vehicles detected within the video data and further reporting the results. As another example, a public safety agency may include a request to search for a person matching characteristics (e.g., face identification) of a suspect wanted by the agency. In this case, the electronic computing device 110 may determine a video analytics task that will include comparing the characteristics of the particular suspect with all persons detected within the video data and further reporting a result when there is a match. As yet another example, an agency may request to report suspicious or anomalous activities (e.g., loitering, vehicle speeding, weapon discharge, drug trafficking etc.) at the scene. In this case, the electronic computing device 110 may determine a video analytics task that will include processing the activities and behaviors of persons and objects detected from the video data captured at the scene and reporting in case of detecting a suspicious activity. In further embodiments, the electronic computing device 110 may also determine a video analytics task to be performed on the video data based on the predicted scene data. For example, the predicted scene data associated with the scene may indicate that delivery vehicles are expected to arrive at the scene. In this case, the electronic computing device 110, automatically or based on user input, determines a video analytics task that will require detecting arrival of delivery vehicles and further running package detection for packages delivered from the delivery vehicles.

Next, at block 330, the electronic computing device 110, estimates, based on the predicted scene data, an edge computing cost to be incurred to complete execution of the video analytics task at one or more edge computing devices 120 associated with an agency owning and/or operating the video cameras 140. In one embodiment, the electronic computing device 110 determines, based on the predicted scene data, devices capabilities required to complete the video analytics task (i.e., a video analytics task determined at block 320) at the one or more edge computing devices 120. As an example, the device capabilities required to complete execution of the video analytics task include one or more of: an amount of processing load required to complete the video analytics task, an amount of data storage required to complete the video analytics task, and an amount of electrical power required to complete the video analytics task. The device capabilities may also further include an amount of network bandwidth or other network capabilities required to complete execution of the video analytics task. The electronic computing device 110 then estimates the edge computing cost as a function of the device capabilities required to complete the video analytics task at the one or more edge computing devices 120. In accordance with embodiments, the estimated edge computing cost may vary for the same video analytics task as a function of predicted scene data i.e., based on one or more of: counts of persons or objects predicted to be present at the scene at the particular time period, expected activity level or behavioral level of persons predicted to be present at the scene at the particular time period, type of objects predicted to be present at the incident scene, weather conditions (e.g., cloudy, hazy, fog, rain, etc.), season, lighting conditions, and other environmental factors (e.g., presence of smoke, dust, etc.).

As an example, an edge computing cost estimated to be incurred to complete execution of a video analytics task on a scene which is predicted to have poor lighting conditions will be higher than an edge computing cost estimated to be incurred to complete execution of the same video analytics task on a scene which is predicted to have good lighting conditions. Accordingly, the cost incurred to complete execution of a video analytics task will increase as the lighting conditions predicted at the scene get worse because processing video data captured under poor lighting conditions (e.g., during night time) will involve more computation (and therefore better device capabilities) than processing video data captured under better lighting conditions (e.g., during day time).

As another example, an edge computing cost estimated to be incurred to complete execution of a video analytics task on a scene which is predicted to have an higher activity level (e.g., when the number of persons/vehicles predicted to be captured from the scene is more than a predefined threshold) will be higher than an edge computing cost estimated to be incurred to complete execution of the same video analytics task on a scene which is predicted to have a low activity level (e.g., when the number of persons/vehicles predicted to be captured from the scene is not more than a predefined threshold). Accordingly, the cost incurred to complete execution of a video analytics task will increase with the increase in the activity level predicted at the scene because processing video data captured at a scene involving higher activity level (e.g., during a peak hour) will involve more computation (and therefore better device capabilities) than processing video data captured at a scene involving lower activity level (e.g., during an off-peak hour). For instance, assume that the video analytics task determined at block 320 involves running the license plates of all vehicles detected at the scene at a particular time period in the future. Briefly referring to the examples shown in FIGS. 4 and 5, the predicted scene data shown in FIG. 4 indicates that only few vehicles are expected to stop or pass through the traffic intersection scene 150-1. In contrast, the predicted scene data shown in FIG. 5 indicates that a large number of vehicles are expected to stop or pass through the traffic intersection scene 150-2. Accordingly, an edge computing cost to be incurred to complete the video analytics task based on the predicted scene data shown in FIG. 4 will be lower than an edge computing cost to be incurred to complete the same video analytics task based on the predicted scene data shown in FIG. 5. In other words, executing a video analytics task for the traffic intersection scene 150-2 shown in FIG. 5 will require more device capabilities than it is required to execute the video analytics task for the traffic intersection scene 150-2 shown in FIG. 4 because of the differences in the activity levels expected at the traffic intersection scenes 150-1, 150-2 during the off-peak hour and peak hour, respectively.

In accordance with some embodiments, the electronic computing device 110 estimates an edge computing cost based on whether the one or more edge computing devices 120 will need to be upgraded or replaced in order to complete the video analytics task (or in some cases after the completion of the video analytics task). In these embodiments, the electronic computing device 110 determines device capabilities to be expected from the one or more edge computing devices 120 at a time the one or more edge computing devices 120 will begin to execute the video analytics task. The expected device capabilities of the edge computing devices 120 include one or more of: an expected load at a processor of the edge computing devices 120, expected data storage available at a memory of the edge computing devices 120, expected battery capacity at a battery of the edge computing devices 120, and thermal or cooling capacity of the edge computing devices 120. In some embodiments, the expected device capabilities may further include an expected network bandwidth, network load, or other network parameters at the edge computing devices 120. The expected device capabilities will vary depending on other video analytics tasks that may be performed by the one or more edge computing devices 120 prior to or concurrently at a time at which the one or more edge computing devices 120 will begin to execute the video analytics task determined at block 320. The electronic computing device 110 further determines whether the expected device capabilities meet the device capabilities required to complete the video analytics task at the one or more edge computing devices 120. The electronic computing device 110 further determines a cost for upgrading the expected device capabilities of the one or more edge computing devices 120 to meet the device capabilities required to complete the video analytics task. The electronic computing device 110 then determines the edge computing cost as a function of the cost for upgrading the device capabilities required to complete the video analytics task. As an example, the edge computing devices 120 may have certain limitations such as power limits due to the type of power source (e.g., battery, power over ethernet) used by the edge computing devices 120 or limitations based on thermal or cooling capacity. When the device capabilities indicates that the edge computing devices 120 will not have enough power or cooling capacity to execute the video analytics task determined at block 320 in addition to other video analytics tasks that the edge computing devices 120 may be expected to concurrently perform at the same time, there may be an added cost to upgrade the power (e.g., by replacing with new batteries) or cooling capacity that will be required for the edge computing devices 120 to execute the video analytics task determined at block 320.

Next, at block 340, the electronic computing device 110 estimates, based on the predicted scene data, a cloud computing cost to be incurred to complete execution of the video analytics task at one or more cloud computing devices 130. In one embodiment, the electronic computing device 110 estimates the cloud computing device based on a cloud subscription cost or an on-demand cost. The cloud subscription cost may refer to the cost currently paid by an agency for subscribing to video analytics services provided through the cloud computing devices 130. In some cases, the current cloud subscription cost may have certain limitations with respect to the video analytics services that may be provided through the cloud computing devices 130. For example, the cloud subscription cost may have limitations on video data (e.g., in terms of the amount or quality of video data) that can be transmitted, processed, or stored at the cloud computing devices 130 for performing video analytics. As another example, the cloud subscription cost may have limitations on the number or types of video analytics tasks that may be performed by the one or more cloud computing devices 130. The on-demand cost may refer to the cost that will be paid on-demand for availing a particular video analytics service as needed from the cloud computing devices 130. The on-demand cost may also vary according to the utilization and/or number of connections expected at the cloud computing devices 130 at the time at which the one or more edge computing devices 120 will begin to execute the video analytics task determined at block 320. The on-demand cost may also vary depending on the time of the day, season, geographic location etc. In these embodiments, the electronic computing device 110 may obtain information regarding the current cloud subscription cost or on-demand cost from one or more of the cloud computing devices 130 or another web server hosted by cloud video analytics service providers. In some embodiments, the electronic computing device 110 estimates the cloud computing cost based on cloud computing costs previously incurred for completing a similar type of the video analytics task on video data historically captured corresponding to the same or similar scene. As an example, assume that the electronic computing device 110 needs to assign a video analytics task corresponding to the traffic intersection scene 150-2 shown in FIG. 5. In this example, further assume that the video analytics task involves searching for a person with characteristics (e.g., face identity) matching a wanted suspect and providing an alert when a match is detected. The predicted scene data associated with the traffic intersection scene 150-2 shown in FIG. 5 indicates a high activity level with a large number of persons and objects (e.g., vehicles) expected to be present or pass through the traffic intersection scene 150-2 during the peak-hour. Accordingly, in this example, the electronic computing device 110 may access costs that were historically incurred to complete a similar video analytics task (e.g., searching for a person with characteristics matching a wanted suspect) for one or more previously processed scenes with similar scene data (i.e., when activity levels at the previously processed scenes match or correlate with the activity levels indicated by the predicted scene data associated with the traffic intersection scene 150-2). The electronic computing device 110 then estimates a cloud computing cost to be incurred for completing execution of the current video analytics task (determined at block 320) at the cloud computing devices 130 using the costs (e.g., by averaging the costs) historically incurred for performing a similar type of video analytics task on video data historically captured corresponding to the same or similar scene 150-2.

At block 350, the electronic computing device 110 determines whether the edge computing cost is lower than the cloud computing cost.

At block 360, the electronic computing device 110 assigns the video analytics task to the one or more edge computing devices 120 when the edge computing cost is lower (or in one embodiment, not greater) than the cloud computing cost. In the example traffic intersection scene 150-1 shown in FIG. 4, the electronic computing device 110 may determine that an edge computing cost estimated to be incurred to complete a video analytics task (e.g., running license plates of vehicles detected from video data captured at the traffic intersection scene 150-1) at the one or more edge computing devices 120 is lower than a cloud computing cost estimated to be incurred to complete the same video analytics task at the one or more cloud computing devices 130. The predicted scene data associated with the traffic intersection scene 150-1 shown in FIG. 4 indicates a low activity level i.e. only few vehicles are expected to pass through the traffic intersection scene 150-1 during the off-peak hour. In this case, the electronic computing device 110 may determine that device capabilities such as processor load, data storage, network bandwidth, and electrical power required to complete the video analytics task at the edge computing devices 120 may be lower. The electronic computing device 110 may further determine a corresponding cost to be incurred to complete execution of the video analytics task at the edge computing devices 120 to be lower than a cloud computing cost (e.g., on-demand cloud computing cost) to be incurred to complete execution of the same video analytics task at the cloud computing devices 130. Accordingly, in this example, the electronic computing device 110 assigns the video analytics task associated with the traffic intersection scene 150-1 to the one or more edge computing devices 120.

In accordance with some embodiments, after assigning the video analytics task, the electronic computing device 110 transmits an electronic notification to the video camera 140 indicating the assignment of the video analytics task to the one or more edge computing devices 120. The electronic computing device 110 may also optionally transmit a notification to the one or more edge computing devices 120 indicating the assignment of the video analytics task to the one or more edge computing devices 120. In one embodiment, the notification includes information related to one or more of: a resource identifier identifying the one or more edge computing devices 120 to which the video analytics task is assigned, a particular time period in the future during which video data is to be captured and transmitted by the video camera 140 to the one or more edge computing devices 120 for executing the video analytics task, and information indicating a type of one or more video analytics tasks to be requested from the one or more edge computing devices 120. In response, the video camera 140 will wait until the beginning of the particular time period in the future (e.g., 6.00 AM next day) to capture video data corresponding to the scene and further transmit the video data to the one or more edge computing devices 120, for example, via a local area network. The video camera 140 may also optionally transmit information indicating a type of video analytics task to be performed by the edge computing devices 120. The edge computing devices 120 in turn execute the video analytics task by processing the video data received from the video camera 140 using the video analytics engine implemented at the edge computing devices 120 and may further store and/or transmit video analytics data (e.g., results of running license plates of vehicles detected at a traffic intersection scene) after completing the execution of the video analytics task.

Alternatively, when it is determined, at block 350, that the edge computing cost is not lower (or in one embodiment, greater) than the cloud computing cost, the electronic computing device 110 proceeds to block 370 to assign the video analytics task to the one or more cloud computing devices 130. In the example traffic intersection scene 150-2 shown in FIG. 5, the electronic computing device 110 may determine that an edge computing cost estimated to be incurred to complete execution of a video analytics task (e.g., running license plates of vehicles detected at the traffic intersection scene 150-2) at the one or more edge computing devices 120 is not lower than a cloud computing cost estimated to be incurred to complete execution of the same video analytics task at the one or more cloud computing devices 130. The predicted scene data associated with the traffic intersection scene 150-2 shown in FIG. 5 indicates a high activity level, i.e., a large number of vehicles are expected to pass through the traffic intersection scene 150-2 during the peak-hour. In this case, the electronic computing device 110 may determine that device capabilities such as processor load, data storage, network bandwidth, and electrical power required to complete the video analytics task at the edge computing devices 120 may be higher, for example, relative to device capabilities required to process the traffic intersection scene 150-1 shown in FIG. 4. The electronic computing device 110 may further determine the corresponding cost incurred to execute the video analytics task at the edge computing devices 120 to be higher than a cloud computing cost (e.g., a cloud subscription cost) incurred to complete the same video analytics task at the cloud computing devices 130. Accordingly, in this example, the electronic computing device 110 assigns the video analytics task associated with the traffic intersection scene 150-2 to the one or more cloud computing devices 130.

In one embodiment, after assigning the video analytics task, the electronic computing device 110 transmits an electronic notification to the video camera 140 indicating the assignment of the video analytics task to the one or more cloud computing devices 130. The electronic computing device 110 may also optionally transmit a notification to the one or more cloud computing devices 130 indicating the assignment of the video analytics task to the one or more cloud computing devices 130. In one embodiment, the notification includes information related to one or more of: a resource identifier identifying the one or more cloud computing devices 130 to which the video analytics task is assigned, a particular time period in the future (e.g., 4.30 PM evening on the same day) during which video data is to be captured and transmitted by the video camera 140 to the one or more cloud computing devices 130 for executing the video analytics task, and information indicating a type of video analytics task to be requested from the one or more cloud computing devices 130. In response, the video camera 140 will wait until the beginning of the particular time period in the future to capture video data corresponding to the scene and further transmit the video data to the one or more cloud computing devices 130. The video camera 140 may also optionally transmit information indicating a type of video analytics task to be performed by the cloud computing devices 130. The cloud computing devices 130 in turn execute the video analytics task by processing the video data received from the video camera 140 using the video analytics engine implemented at the cloud computing devices 130 and may store and/or transmit video analytics data (e.g., results of running license plates of vehicles detected at a traffic intersection scene 150-2) after completing the execution of the video analytics task.

In accordance with some embodiments, the electronic computing device 110 repeats the process 300 each time a video analytics task is to be assigned corresponding to video data to be captured from the same or different scene. As an example, referring to FIG. 4, assume that the electronic computing device 110 has completed execution of the process 300 and assigned a first video analytics task (e.g., running for license plates of vehicles detected at the traffic intersection scene 150-1) to one or more edge computing devices 120 based on predicted scene data (e.g., during an off-peak hour such as a morning time) associated with the traffic intersection scene 150-1. Further assume that the electronic computing device 110 receives an input (e.g., from an authorized user associated with an agency owning and/or operating the video camera 140) indicating a request for assigning a second video analytics task (e.g., searching for a person with characteristics matching a wanted suspect) with respect to the same scene, but for a different period of time. The input received at the electronic computing device 110 triggers the re-execution of the process 300. In response to the trigger, the electronic computing device 110 obtains an updated predicted scene data associated with the same scene (e.g., a traffic intersection scene 150-2 shown in FIG. 5) corresponding to which second video data is to be captured at a second time period using one or more video cameras 140. The electronic computing device 110 then estimates, based on the updated predicted scene data, an edge computing cost to be incurred to complete execution of the second video analytics task at the one or more edge computing devices 120 and a cloud computing cost to be incurred to complete execution of the second video analytics task at the one or more cloud computing devices 130. If the edge computing cost to be incurred to complete execution of the second video analytics task is lower than the cloud computing cost to be incurred to complete execution of the second video analytics task, then the electronic computing device 110 assigns the second video analytics task to the one or more edge computing devices 120. On the other hand, if the edge computing cost to be incurred to complete execution of the second video analytics task is not lower than the cloud computing cost to be incurred to complete execution of the second video analytics task, then the electronic computing device 110 assigns the second video analytics task to the one or cloud computing devices 130.

In accordance with some embodiments, the electronic computing device 110 may assign more than one video analytics task corresponding to the same scene, where a first video analytics task may be assigned to the one or more edge computing devices 120 and a second video analytics task may be assigned to the one or more cloud computing devices 130. For example, referring to FIG. 4, assume that the predicted scene data (e.g., during a weekend) corresponding to the traffic intersection scene 150-1 indicates that the numbers of persons predicted to be present at the traffic intersection scene will be lower than a predefined number. This may be based on the information that the coffee shop included in the traffic intersection scene 150-1 is expected to be closed on the weekend. Further assume that the predicted scene data corresponding to the same traffic intersection scene 150-1 indicates that the number of vehicles predicted to pass through the traffic intersection scene during the same period of time will be higher than a predefined number. This may be based on the information that the traffic intersection scene 150-1 connects the city to a national highway. In this example, the electronic computing device 110 may determine that a first video analytics task (e.g., requiring searching a person with characteristics matching a wanted suspect at the traffic intersection scene 150-1) and a second first video analytics task (requiring running of license plates of vehicles detected at the traffic intersection scene 150-1) are to be assigned. In this case, the electronic computing device 110 may assign the first video analytics task to the one or more edge computing devices 120 when the electronic computing device 110 determines that an estimated edge computing cost to be incurred to complete execution of the first video analytics task at the one or more edge computing devices 120 is lower than an estimated cloud computing cost to be incurred to complete execution of the first video analytics task at the one or more edge computing devices 120. The edge computing cost to be incurred to complete execution of the first video analytics task may decrease with the decrease in the number of persons predicted to be present at the traffic intersection scene 150-1. With respect to the second video analytics task, the electronic computing device 110 may assign the second video analytics task to the one or more cloud computing devices 130 when the electronic computing device 110 determines that an estimated edge computing cost to be incurred to complete execution of the second video analytics task at the one or more cloud computing devices 130 is not lower than an estimated edge computing cost to be incurred to complete execution of the second video analytics task at the one or more cloud computing devices 130. The edge computing cost to be incurred to complete execution of the second video analytics task may increase with the increase in the number of vehicles predicted to pass through the traffic intersection scene 150-1. In addition to the computation cost associated with detecting the vehicles, there may also be additional cost (e.g., network cost) associated with downloading license records from a remote database and further processing the license plate numbers against the records. In this case, the electronic computing device 110 will assign the second video analytics task to the one or more cloud computing devices 130 as the cloud computing cost associated with running the license plates of vehicles detected at the traffic intersection will be lower than the edge computing cost.

In accordance with some embodiments, the electronic computing device 110 may re-assign a video analytics task from one or more edge computing devices 120 to one or more cloud computing devices 130 or vice versa based on a change in the predicted scene data associated with a scene.

Figure 4:
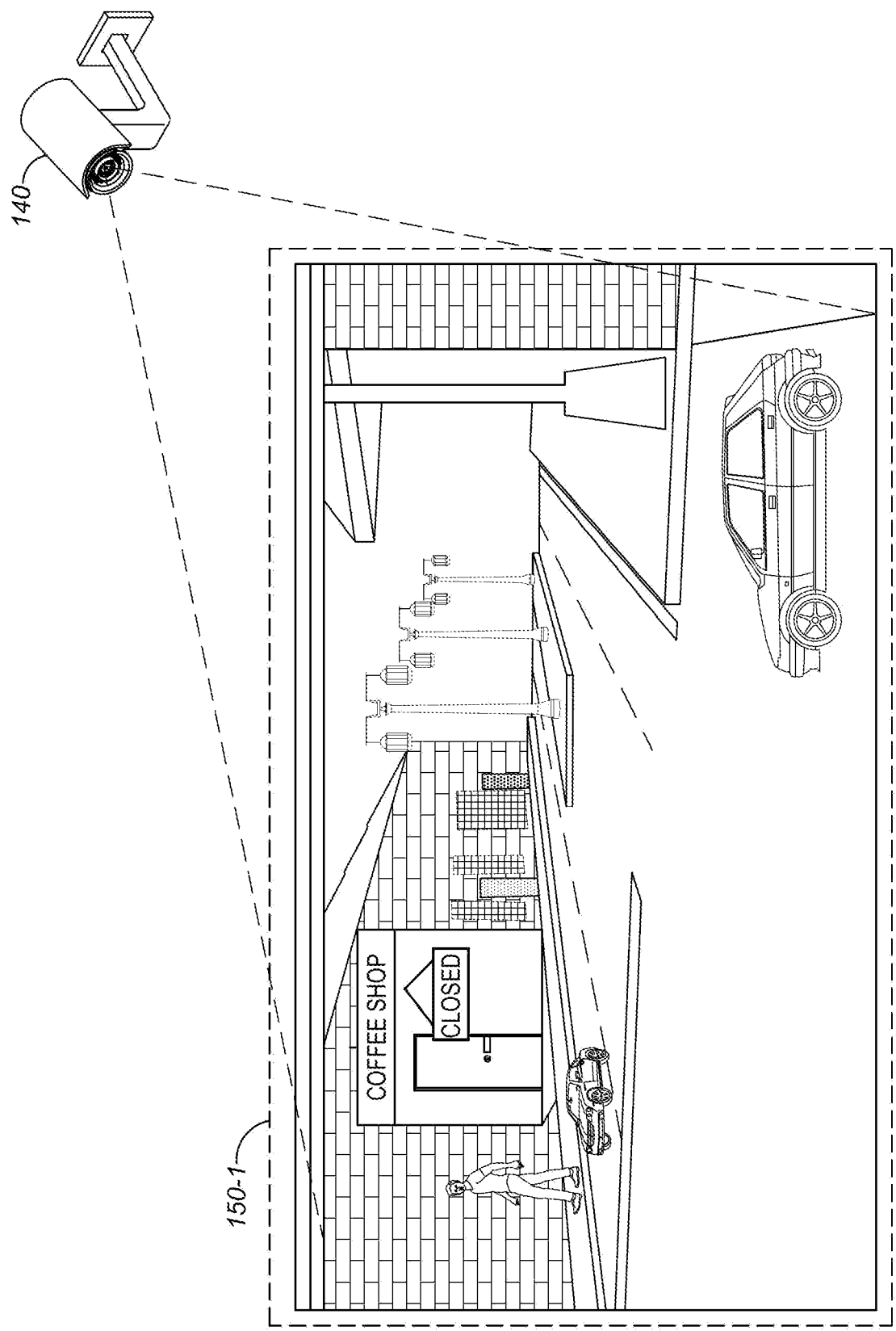
FIG. 4 illustrates an example of predicted scene data when a video analytics task is assigned to one or more edge computing devices in accordance with some embodiments.
Figure 5:
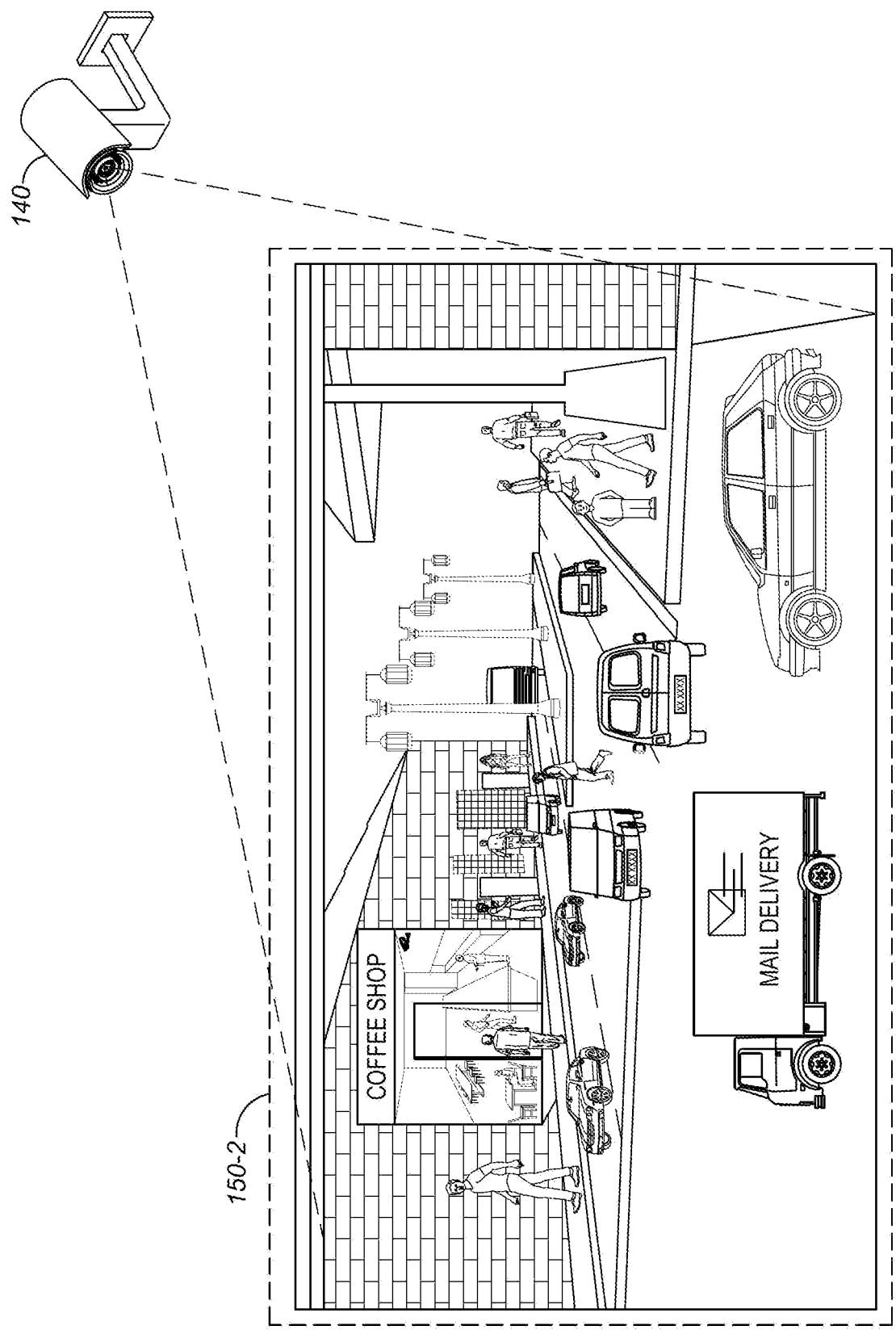
FIG. 5 illustrates another example of predicted scene data when a video analytics task is assigned to one or more cloud computing devices in accordance with some embodiments.

As an example, with respect to the traffic intersection scene 150-1 shown in FIG. 4, assume that the edge computing device 120 is currently executing an assigned video analytics task that requires running license plates of vehicles detected at the scene 150-1. Further assume that the electronic computing device 110 has received new information indicating that vehicles are being re-routed through a street merging at the traffic intersection scene 150-1 because of a vehicle accident near a location of the traffic intersection scene 150-1. In this case, the electronic computing device 110 re-executes the process 300 to update the predicted scene data to reflect the predicted increase in vehicle traffic near the traffic intersection scene 150-1 and to further determine if the video analytics task currently performed by the one or more edge computing devices 120 is to be re-assigned to the one or more cloud computing devices 130 based on the predicted increase in vehicle traffic near the traffic intersection scene 150-1. If the electronic computing device 110 determines, based on the updated predicted scene data, that a cloud computing cost to be incurred to complete execution of the video analytics task at the one or more cloud computing devices 130 will be lower than or equal to an edge computing cost to be incurred to complete the execution of the video analytics task at the one or more edge computing devices 120, then the electronic computing device 110 re-assigns the video analytics task from the one or more edge computing devices 120 to the one or more cloud computing devices 130. When there is a further change in the predicted scene data, for example, indicating a possible decrease in the number of vehicles that may pass through the traffic intersection scene 150-2, the electronic computing device 110 may similarly re-execute the process 300 and re-assign the video analytics task from the one or more cloud computing devices 130 to the one or more edge computing devices 120 in case the edge computing cost falls below the cloud computing cost.

While embodiments of the present disclosure are described with examples relating to assignment of public-safety related video analytics tasks, embodiments of the present disclosure can be also readily adapted for non-public safety use cases such as manufacturing, retail, and healthcare environments where there may be a need to assign video analytics tasks to one or more of edge computing devices 120 or cloud computing devices 130 based on predicting scene data and the associated edge and cloud computing costs to be incurred to complete execution of video analytics tasks at the edge and cloud computing devices 130.

As should be apparent from this detailed description, the operations and functions of the computing devices described herein are sufficiently complex as to require their implementation on a computer system, and cannot be performed, as a practical matter, in the human mind. Electronic computing device 110s such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of assigning video analytics tasks to computing devices, the method comprising:
obtaining, at an electronic computing device, predicted scene data associated with a scene corresponding to which video data is to be captured at a particular time period using one or more video cameras;
determining, at the electronic computing device, a video analytics task to be performed on the video data;
estimating, at the electronic computing device, based on the predicted scene data, a edge computing cost to be incurred to complete execution of the video analytics task at one or more edge computing devices;
estimating, at the electronic computing device, based on the predicted scene data, a cloud computing cost to be incurred to complete execution of the video analytics task at one or more cloud computing devices;
assigning, at the electronic computing device, the video analytics task to the one or more edge computing devices when the edge computing cost is lower than the cloud computing cost; and
assigning, at the electronic computing device, the video analytics task to the one or more cloud computing devices when the edge computing cost is not lower than the cloud computing cost.

2. The method of claim 1, wherein the predicted scene data includes one or more of: (i) data about persons or objects predicted to be present at the scene at the particular time period, (ii) data about one or more events scheduled or predicted to occur at the scene at the particular time period, (iii) forecasted weather data for a geographical location associated with the scene at the particular time period, and (iv) predicted lighting conditions at the scene at the particular time period.

3. The method of claim 1, wherein estimating the edge computing cost comprises:
determining, based on the predicted scene data, device capabilities required to complete execution of the video analytics task at the one or more edge computing devices; and
estimating the edge computing cost as a function of the device capabilities required to complete execution of the video analytics task at the one or more edge computing devices.

4. The method of claim 3, wherein the device capabilities required to complete execution of the video analytics task include one or more of: an amount of processing load required to complete the video analytics task, an amount of data storage required to complete the video analytics task, and an amount of electrical power required to complete the video analytics task.

5. The method of claim 3, further comprising:
determining device capabilities to be expected from the one or more edge computing devices at a time the one or more edge computing devices will begin to execute the video analytics task;
determining that the expected device capabilities do not meet the device capabilities required to complete execution of the video analytics task;
determining a cost of upgrading the expected device capabilities of the one or more edge computing devices to meet the device capabilities required to complete execution of the video analytics task; and
estimating the edge computing cost as a function of the cost of upgrading the device capabilities required to complete execution of the video analytics task.

6. The method of claim 5, wherein the expected device capabilities of the one or more edge computing devices include one or more of: an expected load at a processor of the one or more edge computing devices, expected data storage available at a memory of the one or more edge computing devices, and expected battery capacity at a battery of the one or more edge computing devices.

7. The method of claim 1, wherein estimating the cloud computing cost comprises one or more of:
estimating the cloud computing cost based on a cloud computing cost previously incurred for completing a similar type of the video analytics task on video data historically captured corresponding to the same scene; and
estimating the cloud computing cost based on a cloud subscription price or an on-demand price.

8. The method of claim 1, wherein the predicted scene data identifies one or more of: a count of persons or objects predicted to be present at the scene at the particular time period, expected activity or behavioral level of the persons predicted to be present at the scene at the particular time period, type of the objects predicted to be present at the scene, and weather and lighting conditions predicted at the scene.

9. The method of claim 8, wherein the edge computing cost to be incurred to complete execution of the video analytics task varies according to one or more of the count of persons or objects predicted to be present at the scene at the particular time period, the expected activity or behavioral level of the persons predicted to be present at the scene at the particular time period, the type of the objects predicted to be present at the scene, and weather and lighting conditions predicted at the scene.

10. The method of claim 1, further comprising:
obtaining, at the electronic computing device, an updated predicted scene data associated with the scene corresponding to which second video data is to be captured at a second time period using one or more video cameras;
determining, at the electronic computing device, at least one other video analytics task to be performed on the second video data;
estimating, at the electronic computing device, based on the updated predicted scene data, an edge computing cost to be incurred to complete execution of the at least one other video analytics task at the one or more edge computing devices;
estimating, at the electronic computing device, based on the updated predicted scene data, a cloud computing cost to be incurred to complete execution of the at least one other video analytics task at the one or more cloud computing devices;
assigning, at the electronic computing device, the at least one other video analytics task to the one or more edge computing devices when the edge computing cost to be incurred to complete execution of the at least one other video analytics task is lower than the cloud computing cost to be incurred to complete execution of the at least one other video analytics task; and
assigning, at the electronic computing device, the at least one other video analytics task to the one or more cloud computing devices when the edge computing cost to be incurred to complete execution of the at least one other video analytics task is not lower than the cloud computing cost to be incurred to complete execution of the at least one other video analytics task.

11. The method of claim 1, wherein the predicted scene data corresponds to video analytics data extracted from one or more prior video data captured corresponding to the scene.

12. An electronic computing device, comprising:
a communications interface; and
an electronic processor communicatively coupled to the communication interface, the electronic processor configured to:
obtain predicted scene data associated with a scene corresponding to which video data is to be captured at a particular time period using one or more video cameras;
determine a video analytics task to be performed on the video data;
estimate, based on the predicted scene data, a edge computing cost to be incurred to complete execution of the video analytics task at one or more edge computing devices;
estimate, based on the predicted scene data, a cloud computing cost to be incurred to complete execution of the video analytics task at one or more cloud computing devices;
assign the video analytics task to the one or more edge computing devices when the edge computing cost is lower than the cloud computing cost; and
assign the video analytics task to the one or more cloud computing devices when the edge computing cost is not lower than the cloud computing cost.

13. The electronic computing device of claim 12, wherein the predicted scene data includes one or more of: (i) data about persons or objects predicted to be present at the scene at the particular time period, (ii) data about one or more events scheduled or predicted to occur at the scene at the particular time period, (iii) forecasted weather data for a geographical location associated with the scene at the particular time period, and (iv) predicted lighting conditions at the scene at the particular time period.

14. The electronic computing device of claim 12, wherein the electronic processor is configured to:
determine, based on the predicted scene data, device capabilities required to complete execution of the video analytics task at the one or more edge computing devices; and
estimate the edge computing cost as a function of the device capabilities required to complete execution of the video analytics task at the one or more edge computing devices.

15. The electronic computing device of claim 14, wherein the device capabilities required to complete the video analytics task include one or more of: an amount of processing load required to complete the video analytics task, an amount of data storage required to complete the video analytics task, and an amount of electrical power required to complete the video analytics task.

16. The electronic computing device of claim 14, wherein the electronic processor is configured to:
determine device capabilities to be expected from the one or more edge computing devices at a time the one or more edge computing devices will begin to execute the video analytics task;
determine that the expected device capabilities do not meet the device capabilities required to complete execution of the video analytics task;
determine a cost of upgrading the expected device capabilities of the one or more edge computing devices to meet the device capabilities required to complete execution of the video analytics task; and
estimate the edge computing cost as a function of the cost of upgrading the device capabilities required to complete execution of the video analytics task.

17. The electronic computing device of claim 16, wherein the expected device capabilities of the one or more edge computing devices include one or more of: an expected load at a processor of the one or more edge computing devices, expected data storage available at a memory of the one or more edge computing devices, and expected battery capacity at a battery of the one or more edge computing devices.

18. The electronic computing device of claim 12, wherein the electronic processor is configured to:
estimate the cloud computing cost based on a cloud computing cost previously incurred for completing a similar type of the video analytics task on video data historically captured corresponding to the same scene.

19. The electronic computing device of claim 12, wherein the electronic processor is configured to:
estimate the cloud computing cost based on a cloud subscription price or an on-demand price.

20. The electronic computing device of claim 12, wherein the predicted scene data identifies one or more of: a count of persons or objects predicted to be present at the scene at the particular time period, expected activity or behavioral level of the persons predicted to be present at the scene at the particular time period, type of the objects predicted to be present at the scene, and weather and lighting conditions predicted at the scene.

* * * * *